United States Patent [19]

Okumura et al.

[11] Patent Number: 4,533,599
[45] Date of Patent: Aug. 6, 1985

[54] MICROCAPSULE AND PROCESS FOR THEIR PRODUCTION

[75] Inventors: Fumio Okumura; Akira Kawai, both of Takasago, Japan

[73] Assignee: Mitsubishi Paper Mills, Ltd., Tokyo, Japan

[21] Appl. No.: 592,845

[22] Filed: Mar. 23, 1984

[30] Foreign Application Priority Data

Mar. 25, 1983 [JP] Japan .................................. 58-51091

[51] Int. Cl.$^3$ ...................... B01J 13/02; B32B 27/42
[52] U.S. Cl. ................................ 428/402.21; 346/205; 346/215; 264/4.7; 427/213.34; 428/402.24
[58] Field of Search ................. 264/4.7; 427/213.34; 428/402.21, 402.24

[56] References Cited

U.S. PATENT DOCUMENTS

| | | | |
|---|---|---|---|
| 4,001,140 | 1/1977 | Foris et al. | 264/4.7 X |
| 4,233,178 | 11/1980 | Fuchigami | 428/402.21 |
| 4,303,548 | 12/1981 | Shimazaki et al. | 264/4.7 |
| 4,353,809 | 10/1982 | Hoshi et al. | 264/4.7 |

FOREIGN PATENT DOCUMENTS 51-9079  1/1976  Japan .
54-49984 4/1979  Japan .

*Primary Examiner*—Richard D. Lovering
*Attorney, Agent, or Firm*—Cushman, Darby & Cushman

[57] ABSTRACT

By using, in production of microcapsules, a partially esterified product of a styrene-maleic anhydride copolymer as an emulsifier, advantages are obtained that coloring of emulsion can be reduced/prevented at the time of emulsification and, when the microcapsules produced are used in a carbonless copying paper, a desensitizer component is not transferred to a lower paper and accordingly color development is not hindered.

8 Claims, No Drawings

MICROCAPSULE AND PROCESS FOR THEIR PRODUCTION

This invention relates to a process for producing microcapsules. More particularly, it relates to a process for producing microcapsules suitable for use in carbonless copying papers.

Microcapsules are suitable for holding unstable materials (reactive materials, liquids, etc.) stably.

There are various processes for producing microcapsules. The generally known typical processes include the physical process, the coacervation process, the interfacial polymerization process, the in situ polymerization process, etc.

The physical process is suitable for certain applications (drugs, etc.), however, is very insufficient from the standpoint of holding the contents because the microcapsules produced by this process have imcomplete films.

The coacervation process is widely used and the microcapsules produced by this process can contain various materials such as colorless dyes for carbonless copying paper, adhesives, liquid crystals and the like.

In producing microcapsules according to the coacervation process, there are ordinarily used gelatin and at least one member selected from anionic materials such as gum arabic, sodium alginate, vinyl acetate-maleic anhydride copolymers, polyacrylic acids and the like. The essential drawbacks of the coacervation process are that, because gelatin is used as a major material of microcapsules, the cost of microcapsules produced is high, it is difficult to produce an emulsion containing a high concentration of microcapsules, and microcapsules produced have poor water resistance and are liable to be attacked by microorganisms. Further, the coacervation process requires intricate steps in production of microcapsules.

The interfacial polymerization process is a process wherein a microcapsule wall film of a polyamide, an epoxy resin, a polyurethane, a polyurea or the like is formed at the interface between water and a hydrophobic liquid. This process can provide microcapsules having an excellent holding ability for contents, depending upon kinds of film materials used.

In the interfacial polymerization process, there are used very reactive or very toxic materials such as an acid chloride, an isocyanate, an epoxy compound and the like. Hence, the process has various drawbacks that control of reactions is difficult, compounds having an active hydrogen can not be contained in microcapsules, and materials used are expensive.

Also, the in situ polymerization process wherein an amino resin is utilized as a microcapsule film material is in practical use. Relevant patents have been applied. As an example, in Japanese Laid-open Pat. No. 9079/1976, as a system modifier (an emulsifier) there is used an ethylene-maleic anhydride copolymer, a methyl vinyl ether-maleic anhydride copolymer, a polyacrylic acid or the like, and as a microcapsule film material there is used an urea-formaldehyde resin. Also, in Japanese Laid-open Pat. No. 49984/1979, as an emulsifier there is used a styrene-maleic anhydride copolymer and as a microcapsule film material there is used a melamine-formaldehyde resin.

The microcapsules produced by the above process are excellent in that they are highly resistant to water and microorganisms. However, because an acidic emulsifier is used, when colorless dye-containing microcapsules for use in carbonless copying papers are produced, liquid phase coloring takes place upon emulsification of a colorless dye-dissolving oil by said acidic emulsifier, whereby the microcapsules produced have a color resulting in coloring of the microcapsules-coated surface. This phenomenon is particularly conspicuous when a fluoran type lactone dye is used and its improvement has strongly been desired for years.

The general embodiment of carbonless copying papers is as follows. An upper paper coated with microcapsules containing a colorless dye-dissolving oil is superimposed with a lower paper coated with a color developer which develops a color by reacting with said colorless dye so that the coated sides of the two papers come in contact; the microcapsules are broken by applying a pressure on the non-coated side of the upper paper; thereby the colorless dye-dissolving oil is transferred to the color developer layer of the lower paper to cause reaction and color development.

In order to reduce liquid phase coloring caused by an acidic material at the time of emulsification, it is possible to use, together with a colorless dye, a compound selected from polar desensitizers having a ketone group, an ester group, an amino group, an ether linkage or the like. However, when the upper paper produced thus and a lower paper are superimposed and a pressure is applied to cause color development, the polar desensitizer used is transferred to the lower paper together with the colorless dye-dissolving oil, whereby color development is hindered.

The present inventors made extensive studies on reduction of liquid phase coloring without hindrance of color development. As a result, the present invention has been completed.

It has been found out in our studies that, by using, as an emulsifier in production of microcapsules, a partially esterified product of a styrene-maleic anhydride copolymer, coloring of an emulsion can be reduced/prevented at the time of emulsification and further, when the microcapsules obtained are coated on an upper paper, a desensitizer component is not transferred to a lower paper and accordingly color development is not hindered.

It has also been found in our studies that use of a partially esterified product of a styrene-maleic anhydride copolymer as an emulsifier further provides the following two important advantages.

1. The rate of emulsification is faster compared with the case when a styrene-maleic anhydride copolymer is used. This enables use of wider conditions for homogenizer operation, easier control of particles formed by emulsification and shortening of emulsification time, all of which are beneficial from the standpoint of production process.

2. The viscosity of a microcapsule fluid is reduced. This enables production of a microcapsule fluid containing a high concentration of microcapsules, which provides a great benefit.

The partially esterified product of a styrene-maleic anhydride copolymer can be obtained by copolvmerizing styrene monomer, maleic anhydride and a required quantity of a mono- or di-ester of maleic acid, or by partially esterifying a styrene-maleic anhydride copolymer.

The kind of ester group in the partially esterified product of a styrene-maleic anhydride copolymer is not particularly limited unless it hinders the role of an emulsifier. The ester group having an alkyl group of 1 to 10 carbon atoms or an aralkyl group are desirable from standpoints of adequacy as an emulsifier, microcapsule production and cost. Examples of these ester groups include those having methyl, ethyl, propyl, butyl, octyl, decyl, benzyl or phenethyl group.

Microcapsules of the present invention can be produced, for example, by a process comprising the following three steps.

(1) A step for emulsifying a hydrophobic material in an equeous solution containing a partially esterified product of a styrene-maleic anhydride copolymer. (An acidic phase step)

(2) A step for producing a precondensate between melamine and formaldehyde. (An alkaline phase step)

(3) A step for microencapsulating an emulsion of the hydrophobic material in an acidic phase with forming a melamine-formaldehyde resin.

In the step (1), a hydrophobic material is dispersed or emulsified in an acidic aqueous solution containing a partially esterified product of a styrene-maleic anhydride copolymer.

The pH at the time of emulsification is controlled to be 7 or lower. The partially esterified product of a styrene-maleic anhydride copolymer is used preferably in a quantity of about 2 to 20 parts by weight relative to 100 parts by weight of the hydrophobic material. Viewed only from the standpoint of dispersion or emulsification, use of the partially esterified product in a larger quantity generally gives a better result. However, the quantity of the partially esterified product used is restricted by various relevant factors and is decided by the solid content, the desired particle size distribution and the viscosity of the dispersion or emulsion formed, the cost of the partially esterified product and so forth.

In the step (2), a precondensate between melamine and formaldehyde is produced.

The precondensate can easily be produced according to an ordinary method. However, the ratio of melamine to formaldehyde is important and a molar ratio 1 (former)/1.5 (latter) or a smaller molar ratio is preferable. A particularly preferable molar ratio is ½ to ⅓. By heating at a temperature of 50° C. or higher in an alkaline phase of a pH of about 8 to 10, melamine is dissolved in a short period of time (15 to 30 min), whereby a precondensate can be obtained.

This precondensate is estimated to be a mixture of (a) various methylolmelamine of different oxymethylation degrees ranging from monomethylolmelamine to hexamethylolmelamine and (b) formaldehyde. A commercially available melamine resin precondensate can also be used if there is an adequate one.

In the step (3), the emulsion obtained in the step (1) and the precondensate between melamine and formaldehyde obtained in the step (2) are mixed and subsequently the mixture is heated, whereby a melamine-formaldehyde resin is formed and simultaneously microcapsules are produced.

The above heating requires a temperature of 50° C. or higher. A temperature of 60° to 80° C. is preferable.

The microcapsules are ordinarily produced in an hour or less. The pH of the mixture of the emulsion and the precondensate is required to be in a range from 3.5 to 7, preferably in a range from 4 to 6.5.

After microcapsules have been produced, the pH of the microcapsules fluid is adjusted to a level at which the fluid is applied.

The hydrophobic material used in the present invention can be a liquid, a solid or a gas at the normal temperature.

With respect to the esterification degree of the partially esterified product of a styrene-maleic anhydride copolymer used in the present invention, a higher esterification degree gives a faster rate of emulsification and a lesser extent of emulsion coloring, but at the same time reduces the solubility of the partially esterified product in water and increases the cost of the product. In our study, an esterification degree of 50% or lower relative to total carbonyl group number was desirable.

Hereinunder, specific examples of microcapsules for use in carbonless copying papers according to the present invention will be explained. Of course, microcapsules for other applications can be produced similarly. In the examples, "parts" is in terms of weight basis.

EXAMPLE 1

Six parts of 3-diethylamino-6-methyl-7-anilinofluoran (ODB) was dissolved in 100 parts of KMC-113 (trademark, manufactured by Kureha Chemical Industry) to obtain a hydrophobic material.

Separately, an n-propyl ester (esterification degree relative to total carbonyl group number: 5%) of a styrene-maleic anhydride copolymer having a molecular weight of about 100,000 was dissolved in a sodium hydroxide solution to prepare an aqueous solution of pH 4.5 containing 5% of the above partially esterified product. In 220 parts of this aqueous solution, 180 parts of the above hydrophobic material (an oil solution of ODB) was emulsified. The emulsion had a grayish purple color.

Separately, a mixture of 13 parts of melamine, 25 parts of 37% formalin solution and 70 parts of water was adjusted to pH 9 by the use of sodium hydroxide and converted into a solution by heating at 80° C., whereby a melamine-formaldehyde precondensate was obtained.

This precondensate was added to the emulsion. The mixture was stirred for 1 hr at 60° C. and, after confirmation of microcapsule formation, cooled to room temperature.

EXAMPLES 2 and 3

Microcapsule fluids were produced in the same manner as in Example 1 except that the n-propyl ester (esterification degree: 5%) of a styrene-maleic anhydride copolymer used in Example 1 was replaced by an n-propyl ester (esterification degree: 10%) of a styrene-maleic anhydride copolymer having a molecular weight of about 100,000 in Example 2 and an n-propyl ester (esterification degree: 20%) of the same copolymer in Example 3.

The emulsions likewise had a grayish purple color, however, the higher the esterification degree, the less was the extent of coloring.

COMPARATIVE EXAMPLE 1

A microcapsules fluid was produced in the same manner as in Example 1 except that the n-propyl ester (esterification degree: 5%) of a styrene-maleic anhydride copolymer used in Example 1 was replaced by a styrene-maleic anhydride copolymer having a moledular weight of about 100,000.

The emulsion has a grayish purple color but the color was deeper than that in Example 1.

EXAMPLE 4

Each of the microcapsule fluids produced in Comparative Example 1 and Examples 1 to 3 was adjusted so as to have a solid content of 40% and tested for viscosity at 20° C. by the use of a B type viscometer.

The pH and the viscosity of each adjusted microcapsule fluid are shown in Table 1.

TABLE 1

|  | pH | Viscosity (cp) |
|---|---|---|
| Comparative Example 1 | 6.30 | 1,190 |
| Example 1 | 6.26 | 1,130 |
| Example 2 | 6.20 | 840 |
| Example 3 | 6.30 | 620 |

As is obvious from Table 1, as the esterification degree became higher, the viscosity of microcapsules fluid decreased. The viscosity of microcapsule fluid, when the ester of 20% esterification degree was used, was about half of the viscosity of microcapsule fluid when the non-esterified copolymer was used.

EXAMPLE 5

Each of the microcapsule fluids produced in Examples 1 to 3 and Comparative Example 1 was adjusted so as to have pH 8 and a solid content of 35%. Using each of the adjusted microcapsule fluids, the following composition was prepared and coated on a plain paper of 41 g/m² so that the dried coated quantity became 5 g/m².

| Composition | |
|---|---|
| Microcapsule fluid | 300 parts |
| Wheat starch | 30 parts |
| 10% Polyvinyl alcohol | 100 parts |

10 Sheets of same coated papers thus obtained were superimposed and they were tested for whiteness by the use of a Hunter's whiteness tester (amber filter). The results are shown in Table 2.

TABLE 2

|  | Whiteness, % |
|---|---|
| Example 3 | 80.4 |
| Example 2 | 79.1 |
| Example 1 | 77.6 |
| Comparative Example 1 | 76.5 |

As is obvious from Table 2, as the esterification degree became higher, the whiteness also became higher.

COMPARATIVE EXAMPLE 2

30 Parts of a p-phenylphenol resin manufactured by Sumitomo Durez Company Limited was dissolved in 70 parts of KMC 113 with heating to obtain a hydrophobic material.

Separately, a styrene-maleic anhydride copolymer having a molecular weight of about 50,000 was dissolved in a sodium hydroxide solution to prepare an aqueous solution of pH 5.2 containing 5% of said copolymer. To 480 parts of this solution was added 360 parts of the hydrohobic material obtained above. The resulting mixture was subjected to emulsification at 40° C. at 5,000 rpm by the use of a TK homogenizer manufactured by Tokushu Kiko Company Limited.

It took 25 min to obtain an emulsion having an average particle diameter of 2.7μ.

EXAMPLE 6

Emulsification of hydrophobic material was conducted in the same manner as in Comparative Example 2 except that the styrene-maleic anhydride copolymer used in Comparative Example 2 was replaced by a methyl ester (esterification degree of total carbonyl group: 40%) of a styrene-maleic anhydride copolymer having a moledular weight of about 50,000.

It took only 10 min to obtain an emulsion having an average particle diameter of 2.7μ. Thus, the emulsification time could be shortened by the use of the esterified product. Subsequently, microcapsules were formed by the use of a melamine-formaldehyde resin, whereby a microcapsule fluid containing good microcapsules was obtained.

COMPARATIVE EXAMPLE 3

Four parts of 3-diethylamino-6-methyl-7-chlorofluoran was dissolved in 100 parts of KMC-113 with heating to obtain a hydrophobic material.

Separately, a styrene-maleic anhydride copolymer having a molecular weight of about 100,000 was converted to 4% aqueous solution of pH 4.5 by the use of sodium hydroxide. To 280 parts of this aqueous solution was added 180 parts of the above hydrophobic material. The resulting mixture was subjected to emulsification, whereby an emulsion having a reddish color was obtained.

This reddish color remained until after production of microcapsules.

EXAMPLE 7

Emulsification of hydrophobic material was conducted in the same manner as in Comparative Example 3 except that the styrene-maleic anhydride copolymer used in Comparative Example 3 was replaced by a 2-ethylhexyl ester (esterification degree of total carbonyl group: 5%) of the same styrene-maleic anhydride copolymer.

The emulsion was less reddish compared with the emulsion in Comparative Example 3. Subsequently, microcapsules were formed. Their color was less reddish compared with the color of microcapsules produced in Comparative Example 3.

What is claimed is:

1. A process for producing microcapsules containing a hydrophobic material as a core material, the process comprising the steps of dispersing or emulsifying a hydrophobic material in the form of discontinuous microparticles in an acidic aqueous solution containing a partially esterified product of a styrene-maleic anhydride copolymer, the partially esterifed product of a styrene-maleic anhydride copolymer being used in a quantity of 2 to 20 parts by weight relative to 100 parts by weight of the hydrophobic material, adding a melamine-formaledhyde precondensate to the dispersion or emulsion obtained, and subjecting the resuting mixture to reaction in an acidic phase with heating to form a shell film on each microparticle.

2. A process for producing microcapsules according to claim 1, wherein the ester group of the partially esterified product of a styrene-maleic anhydride copolymer is selected from those having an alkyl group of 1 to 10 carbon atoms or an aralkyl group.

3. A process for producing microcapsules according to claim 1, wherein the esterification degree of the partially esterified product of a styrene-maleic anhydride copolymer is 50% or lower relative to total carbonyl group number.

4. A process for producing microcapsules according to claim 3, wherein the esterification degree is 5 to 50%.

5. A process for producing microcapsules according to claim 1, wherein the partially esterified product of a styrene-maleic anhydride copolymer is obtained by copolymerizing styrene monomer, maleic anhydride and a required quantity of a mono- or di-ester of maleic acid or by partially esterifying a styrene-maleic anhydride copolymer.

6. A process for producing microcapsules according to claim 1, wherein the melamine-formaldehyde precondensate is obtained by reacting melamine with formaldehyde in a molar ratio of 1 (the former)/1.5 (the latter) or in a lower molar ratio.

7. A process for producing microcapsules according to claim 6, wherein the molar ratio is 1/2 to 1/3.

8. Microcapsules produced by the process defined in claim 1.

* * * * *